United States Patent [19]
Watkins et al.

[11] Patent Number: 5,514,315
[45] Date of Patent: May 7, 1996

[54] POLYPROPYLENE SPA SHELL MANUFACTURING METHOD

[75] Inventors: Jeffrey K. Watkins, Rancho Santa Fe; Walter R. Cumiskey; Victor B. Mc Carthy, both of Vista, all of Calif.

[73] Assignee: Watkins Manufacturing Corporation, Vista, Calif.

[21] Appl. No.: 282,576

[22] Filed: Jul. 29, 1994

[51] Int. Cl.$^6$ .......................... B29C 51/10; B29C 51/14
[52] U.S. Cl. .......................... 264/80; 264/46.4; 264/46.8; 264/512; 264/514; 264/553; 156/82; 427/223
[58] Field of Search .............. 264/80, 321, 553, 264/46.4, 46.5, 46.8, 512, 514; 427/223; 156/82

[56] References Cited

U.S. PATENT DOCUMENTS

| | | | |
|---|---|---|---|
| 3,676,537 | 7/1972 | Winstead | 425/113 |
| 3,893,882 | 7/1975 | Repenning | 425/388 |
| 3,933,562 | 1/1976 | Cruckshank | 264/512 |
| 3,955,266 | 5/1976 | Honami et al. | 264/512 |
| 4,097,319 | 6/1978 | Shimokawa et al. | 264/54 |
| 4,289,717 | 9/1981 | Bortz | 264/257 |
| 4,404,162 | 9/1983 | Miki et al. | 425/387.1 |
| 4,426,065 | 1/1984 | Komatsuzaki et al. | 264/321 |
| 4,567,106 | 1/1986 | Sano et al. | 427/223 |
| 4,612,249 | 9/1986 | Packer et al. | 427/223 |
| 4,622,237 | 11/1986 | Lori | 427/223 |
| 4,919,746 | 4/1990 | Celia | 156/553 |
| 4,986,860 | 1/1991 | Akimoto et al. | 264/45.9 |
| 5,225,125 | 7/1993 | Wildfeuer et al. | 264/80 |
| 5,300,361 | 4/1994 | Vowinkel et al. | 156/82 |
| 5,328,651 | 7/1994 | Gallagher et al. | 264/46.6 |
| 5,338,614 | 8/1994 | Bartz et al. | 428/448 |
| 5,389,168 | 2/1995 | Litchholt et al. | 264/45.9 |

FOREIGN PATENT DOCUMENTS

| | | | |
|---|---|---|---|
| 4024274 | 2/1992 | Germany | 264/46.5 |
| 51-37950 | 3/1976 | Japan | 264/46.4 |
| 52-39705 | 10/1977 | Japan | 264/46.5 |
| 59-176028 | 10/1984 | Japan | 264/46.4 |
| 61-262116 | 11/1986 | Japan | 264/46.4 |

*Primary Examiner*—Allan R. Kuhns
*Attorney, Agent, or Firm*—Price, Gess & Ubell

[57] ABSTRACT

A process of forming a spa shell by selecting a coextruded polypropylene sheet, selectively heating the sheet, vacuum forming the heated sheet on a deep draw female mold to form a molded spa shell shape, flame treating one surface of the molded shell shape, heating the flame-treated surface, and applying a layer of polyurethane foam to the heated surface.

24 Claims, 3 Drawing Sheets

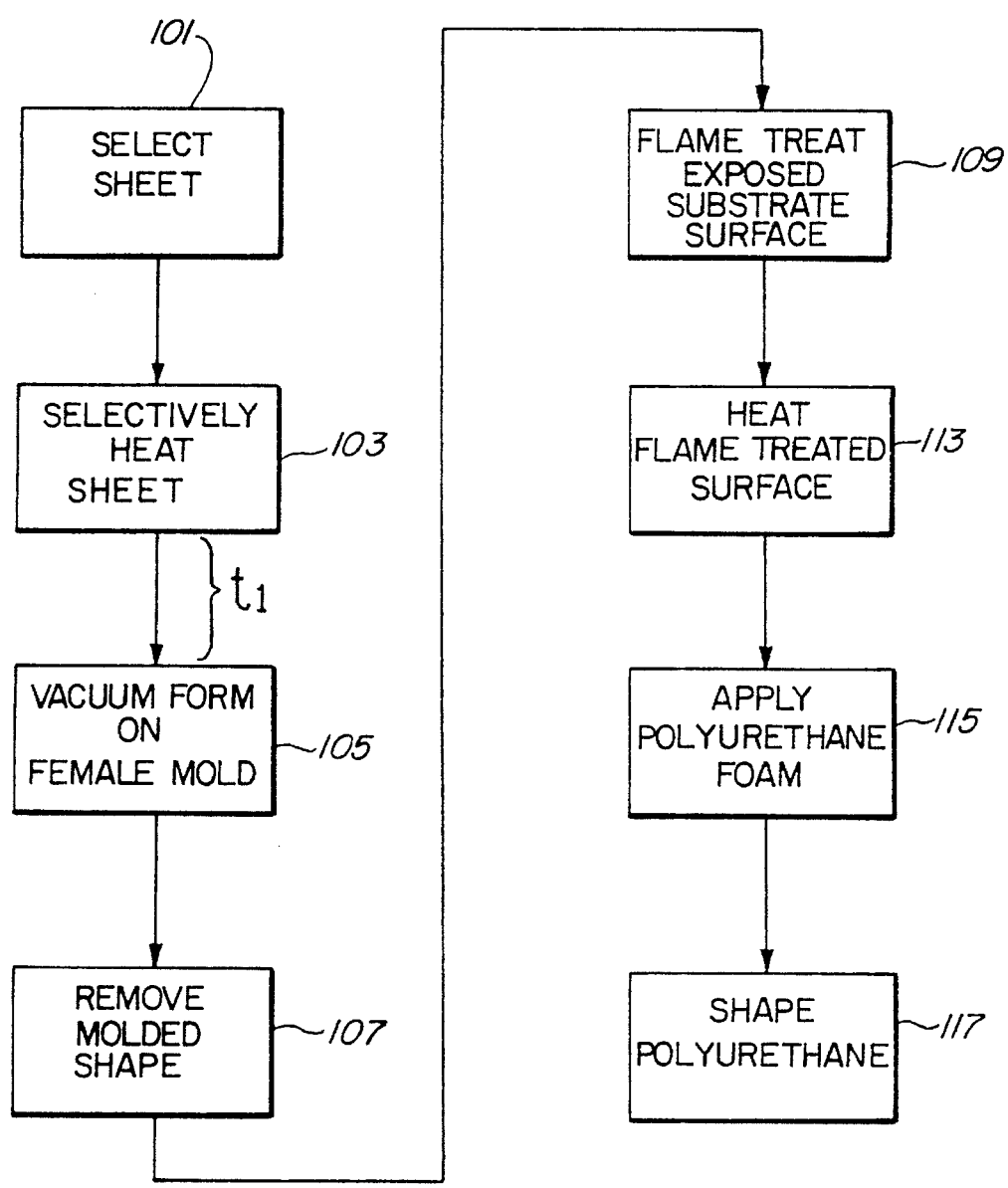

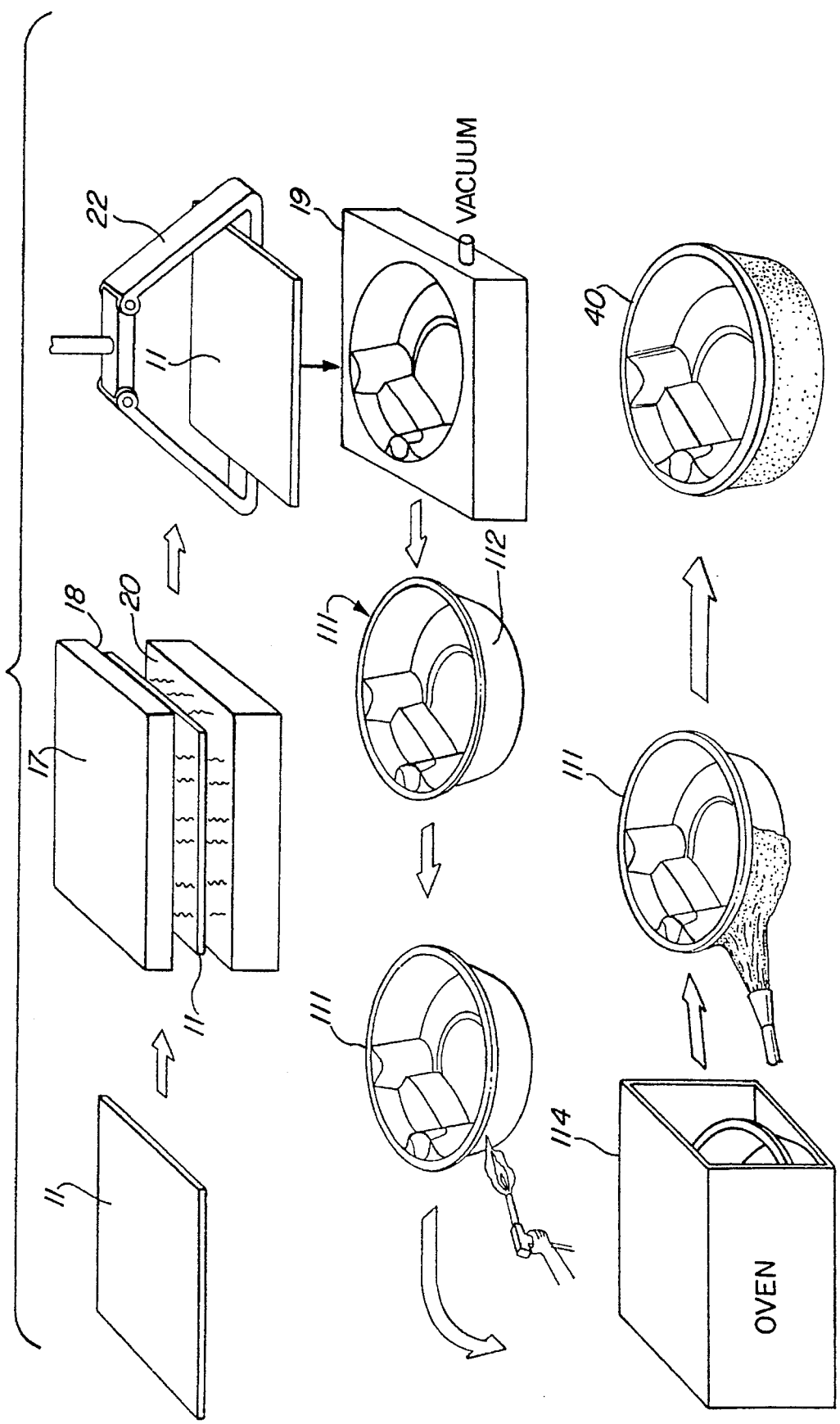

POLYPROPYLENE SPA SHELL MANUFACTURING METHOD

BACKGROUND OF THE INVENTION

1. Field of the Invention

The subject invention relates to the field of plastic fabrication and, more particularly, to a method for forming a deep draw polypropylene spa shell.

2. Description of Related Art

In the prior art, portable spa shells have been fabricated from a variety of materials, including fiberglass-reinforced polyester, acrylic, ABS, and vinyl. The spa shell forms the tub which holds the heated water and attendant chemicals. The combination of hot chlorinated water and the poorly controlled chemical balance encountered in the typical spa environment attacks and damages conventionally-used shell materials.

The inventors have recognized that polypropylene is a material which is highly resistant to damage and deterioration by typical spa environments, particularly when compared to other plastics. They have further recognized that polypropylene could also provide a first class visual appearance.

A number of obstacles confront any effort to construct a spa shell from polypropylene, including the requirement to "deep draw" the material to form tub depths of, for example, 27 inches. Additionally, polypropylene repels the various foam materials typically employed to insulate the spa shell. As opposed to other plastics, polypropylene is a crystalline material and has a narrow temperature window of formability which presents obstacles to forming the various functional areas of a spa tub, as well as achieving the deep draw necessary to form such a tub.

OBJECTS AND SUMMARY OF THE INVENTION

It is therefore an object of the invention to provide an improved portable spa shell;

It is another object of the invention to provide a spa shell having a polypropylene surface;

It is another object of the invention to provide a method for fabricating an improved portable spa shell;

It is another object of the invention to provide an improved spa shell structure;

It is another object of the invention to provide a method for forming a deep drawn spa shell from polypropylene; and It is another object of the invention to provide a method for forming a portable spa shell which is resistant to chemical attack while providing a first class visual appearance.

According to the invention, a polypropylene sheet is selected which comprises a first polypropylene layer coextruded with a second polypropylene layer. The first polypropylene layer forms the interior surface of the spa which is exposed to water, chemicals, and the user's eye, and is particularly formulated for these purposes. The second polypropylene layer forms a substrate which provides the underside or bottom surface of the spa shell, and is particularly formulated for formability and structural support.

Once an appropriate size coextruded polypropylene sheet is selected, it is then heated. During heating, various heat-controlled zones are applied to selectively heat the coextruded sheet to form selected functional areas of the end product. The heated sheet is then vacuum formed on a female mold, and the resultant molded shape removed. The molded shape is subjected to subsequent processes such as flame treating the exposed surface of the second or substrate layer to cause it to accept and bond with a subsequently-applied layer of polyurethane foam. This polyurethane layer provides additional support and thermal insulation.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a side view of a coextruded polypropylene sheet employed according to the preferred embodiment;

FIG. 2 is a schematic flow diagram according to the preferred embodiment;

FIG. 3 is a pictorial schematic diagram illustrating a process according to the preferred embodiment;

DETAILED DESCRIPTION OF THE PREFERRED EMBODIMENTS

Figure 4:
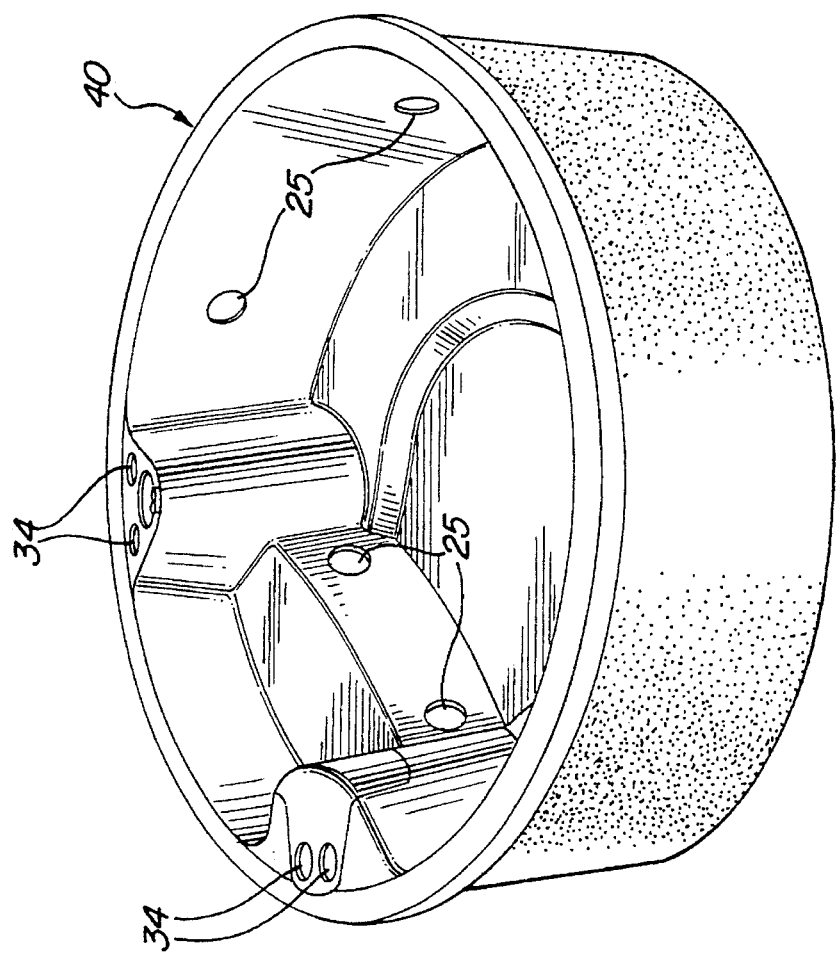
FIG. 4 is a perspective view of a molded spa shell fabricated according to the preferred embodiment.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for simplicity of manufacture and ease of use.

FIG. 1 illustrates a side view of a coextruded polypropylene sheet 11 employed according to the preferred embodiment. The sheet 11 includes a cap layer 13 and a substrate layer 15. The substrate layer 15 is formed from polypropylene pellets, Catalog No. SD 613, available from Himont, Inc., Wilmington, Del. The cap layer 13 is formed of polypropylene pellets, Catalog No. PH 316, as also available from Himont, Inc. The cap layer 13 forms the interior, visually apparent surface of the spa tub 40 (FIG. 3). The cap layer 13 may comprise roughly 15–20% of the thickness of the sheet 11, while the coextruded substrate layer 15 may comprise the remaining 80–85% of that thickness. If the total thickness of sheet 11 is 0.300-inch, a cap layer 13 of 0.045- to 0.060-inch results. Since the cap layer 13 may stretch down to a thinner dimension during the molding process hereafter described, it may be desirable to begin with a thicker cap layer, e.g. 20%. Thinner overall thicknesses, for example, such as 0.250-inch, may be used with a relatively thicker cap layer, as desired.

To form a deep drawn spa shell 111, an extruded polypropylene sheet 11 of appropriate size is selected, step 101 of FIG. 2. The sheet 11 may be selected to be a square of, for example, 94 inches on one side. In the next step, 103, the coextruded polypropylene sheet 11 is heated in a heating facility or oven 17 (FIG. 3). The oven 17 includes ceramic elements, cal rods (electrical resistant heating elements), or infrared sources, as known in the art, to selectively heat the sheet 11 over both sides to facilitate the creation of desired shapes in the ultimate spa tub shell. Elements which heat within ±10° F. of a set point prove advantageous.

A preferred oven 17 in which the polypropylene sheet is heated is separated into individually controlled heating zones, which may number on the order of 15 or more. In addition to the ability to control the on/off times of each heating zone, the upper and lower platens of heaters 18, 20 are capable of being moved closer to or further away from the polypropylene sheet 11 to vary the absorption rate of the infrared and thermal waves of heat emitted from the heating elements.

The sheet 11 is heated to a base temperature of 340° F. for 16 minutes, with additional energy being applied to selected areas. An example of an application of selective heat is in the creation of shapes such as a cup holder 34 (FIG. 4), which presents a complex mold shape. The area of the sheet 11 which is to be conformed to such a mold shape is subjected to considerably more applied energy so that the sheet 11 will stretch more readily to conform to the complex shape.

Once the sheet 11 has been heated, it is transported, for example, by an overhead carriage 22, from the oven 17 and positioned over a female mold 19. A vacuum is then created in the mold 19 to instantaneously suck the heated sheet 11 down about and conforming to the mold 19, step 105 of FIG. 2. Prior to drawing the sheet 1 down about the mold 19, the mold 19 is heated in appropriate places to avoid cosmetic blemishes generally referred to as "chill lines" or "chill cues" by those skilled in the art. Presently, hot air blowers are used to achieve the desired heating, although other techniques could be used, such as resistive heaters or fluid heated tubes directly embedded in the mold 19.

To achieve deep drawing with the sheet 11 shown in FIG. 1, a narrow time window of formability exists. Thus, the time window or interval to from step 103 to step 105, i.e., from the time the sheet 11 leaves the oven 17 to the time it is vacuum formed on the female mold 19, is 10 to 15 seconds.

In the case of the subject spa design, vacuum forming on a female mold 19 is employed so that the surface texture of the cap layer 13 as created during the coextrusion process maintains its integrity during the spa forming process. Forming on a male mold would place the pretextured surface of the polypropylene in direct contact with the mold surface, diluting, or erasing it. In other words, the side in contact with the mold 19 would show all the mold surface features— good (e.g., embossing, texture) or bad (e.g., vacuum holes, surface blemishes).

As shown in step 107 of FIG. 2, once the shell shape 111 has been molded, it is removed from the mold 19. The resultant shell 111 has a depth of, for example, 27 inches. Those skilled in the art generally recognize depths beyond 12 inches to constitute a deep draw. Thus, the spa shell 111 of the preferred embodiment comprises a deep draw polypropylene shell, vacuum formed upon a female mold.

Figure 5:
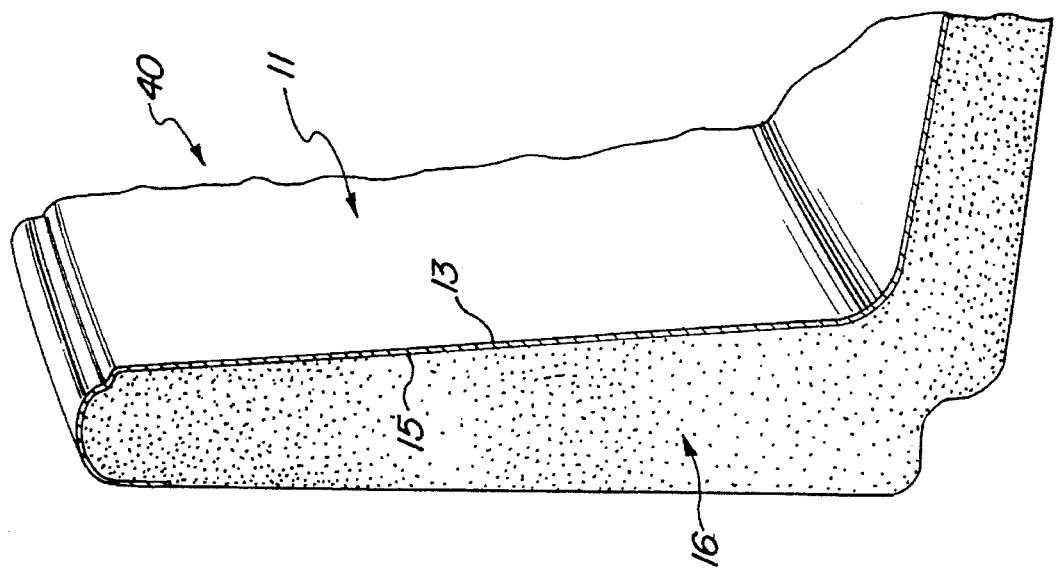
FIG. 5 is a cross-sectional diagram of a spa tub structure constructed according to the preferred embodiment.

To form a particularly useful spa tub structure, the molded shape 111 is further treated. According to the process preferred by the inventors, a flame treatment is applied to the exposed surface 112 of the substrate layer 15, step 109 of FIG. 2. This flame treatment modifies the surface 112 in order to facilitate attachment of a rigid two-pound-density polyurethane foam insulation layer 16 (FIG. 5). Chemically, flame treating is a process whereby the surface of polyolefins is rendered polar through oxidation.

Flame treating processes are known, per se, for example, as described in Philips Chemical Company Technical Service Memorandum TSM-240, August 1979, entitled "Surface Treatment of Marlex Polyolefins for Decorating and Adhesive Bonding." According to the preferred embodiment, a flame is applied by hand-held instruments, as opposed to machine-mounted ones, in order to accommodate the nonflat or irregular surfaces encountered. Without flame treating, the polyurethane foam 16 will not bond to the exposed surface 112 of the polypropylene substrate layer 15. Alternative treatments which might achieve adequate bonding would be the use of a chemical conversion product or application of a corona discharge.

Once treated, the exposed surface 112 of the polypropylene molded shape 111 must be protected from contaminants such as oils, dusts, moisture, etc., prior to application of the polyurethane foam 16. To this end, the molded shape 111 is moved as rapidly as possible to the next steps 113, 115 of heating and applying the polyurethane foam 16.

In step 113, immediately before application of the foam 16, the surface temperature of the exposed surface 112 is brought to 105°–110° F. in a convection heating-type oven 114 (FIG. 3) and held there until the initial application of foam in step 115. In such an oven, forced air is blown across electrical heating elements and then into a chamber containing the molded shape 111. This heating step 113 is an additional step necessary to assure adhesion of the polyurethane foam 16.

After heating in step 113, a mold (not shown) with a release agent applied to its inner surface is positioned to surround the molded shape 111. The polyurethane foam 16 is then sprayed into the mold and allowed to cure. The mold provides the desired contour to the outer surface of the foam 16, for example, as shown in FIG. 5.

The resultant polypropylene spa shell 40 is tough, highly insulated, rugged, and highly resistant to chemicals and corrosion. Scale is easily removed. Chemicals may be added directly into the spa, and a great variety of attractive, strong, and highly chemically resistant spa shapes may be designed and formed according to the invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A process for forming a spa shell from a coextruded polypropylene sheet comprising the steps of:

heating said polypropylene sheet to a base temperature and selectively applying additional heat to preselected areas of said sheet to form a heated polypropylene sheet;

deep drawing said heated polypropylene sheet on a female mold to form a molded spa shape;

modifying one surface of said shape to receive and attach to a polyurethane layer;

heating said surface; and applying a polyurethane layer to said surface.

2. The process of claim 1, further including the step of transporting said heated polypropylene sheet to said female mold.

3. The process of claim 2 wherein the time between completion of said heating step and the start of said deep drawing step is in the range of from between 10 to 15 seconds.

4. The process of claim 3 wherein the step of modifying includes the step of flame treating said surface.

5. The process of claim 4 wherein said step of heating said surface comprises heating the surface to a temperature within the range of 105° to 110° Fahrenheit until initial application of said polyurethane layer.

6. The process of claim 5 wherein said polypropylene sheet comprises first and second layers, said first and second layers respectively comprising a cap layer and a substrate layer, the cap layer comprising 20% or less of the thickness of said sheet.

7. The process of claim 1 wherein said mold provides a deep draw depth in excess of 12 inches.

8. The process of claim 1 wherein said mold provides a deep draw depth of 27 inches or more.

9. The process of claim 1 wherein said polypropylene sheet comprises first and second layers, said first and second layers comprising a cap layer and a substrate layer, the cap layer comprising 20% or less of the thickness of said sheet.

10. The process of claim 1 wherein the time between completion of said heating step and the start of said deep drawing step is in the range of from between 10 to 15 seconds.

11. The process of claim 1 wherein the step of modifying includes the step of flame treating said surface.

12. The process of claim 1 wherein said step of heating said surface comprises heating the surface to a temperature within the range of 105° to 110° Fahrenheit until initial application of said polyurethane layer.

13. A process for forming a tub from a coextruded polypropylene sheet comprising the steps of:

heating said polypropylene sheet to a base temperature and selectively applying additional heat to preselected areas of said sheet to form a heated polypropylene sheet;

deep drawing said heated polypropylene sheet on a female mold to form a molded tub shape;

modifying one surface of said tub shape to receive and attach to a polyurethane layer;

heating said surface; and applying a polyurethane layer to said surface.

14. The process of claim 13, further including the step of transporting said heated sheet to said female mold.

15. The process of claim 14 wherein the time between completion of said heating step and the start of said deep drawing step is in the range of from between 10 to 15 seconds.

16. The process of claim 15 wherein the step of modifying includes the step of flame treating said surface.

17. The process of claim 16 wherein said step of heating said surface comprises heating the surface to a temperature within the range of 105 to 110° Fahrenheit until initial application of said polyurethane layer.

18. The process of claim 17 wherein said polypropylene sheet comprises first and second layers, said first and second layers respectively comprising a cap layer and a substrate layer, the cap layer comprising 20% or less of the thickness of said sheet.

19. The process of claim 13 wherein said mold provides a deep draw depth in excess of 12 inches.

20. The process of claim 13 wherein said mold provides a deep draw depth of 27 inches or more.

21. The process of claim 13 wherein said polypropylene sheet comprises first and second layers, said first and second layers comprising a cap layer and a substrate layer, the cap layer comprising 20% or less of the thickness of said sheet.

22. The process of claim 13 wherein the time between completion of said heating step and the start of said deep drawing step is in the range of from between 10 to 15 seconds.

23. The process of claim 13 wherein the step of modifying includes the step of flame treating said surface.

24. The process of claim 13 wherein said step of heating said surface comprises heating the surface to a temperature within the range of 105° to 110° Fahrenheit until initial application of said polyurethane layer.

* * * * *